(12) United States Patent
Strand

(10) Patent No.: US 8,875,664 B2
(45) Date of Patent: Nov. 4, 2014

(54) WATER HEATER STACKING DETECTION AND CONTROL

(71) Applicant: Honeywell International Inc., Morristown, NJ (US)

(72) Inventor: Rolf L. Strand, Crystal, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/691,573

(22) Filed: Nov. 30, 2012

(65) Prior Publication Data

US 2013/0092103 A1    Apr. 18, 2013

Related U.S. Application Data

(63) Continuation of application No. 11/764,940, filed on Jun. 19, 2007, now Pat. No. 8,322,312.

(51) Int. Cl.
| | |
|---|---|
| F24H 9/20 | (2006.01) |
| G05D 23/19 | (2006.01) |
| F28D 20/00 | (2006.01) |
| F24H 1/20 | (2006.01) |

(52) U.S. Cl.
CPC .......... *F24H 9/2007* (2013.01); *G05D 23/1919* (2013.01); *F24H 9/2035* (2013.01); *F28D 20/0034* (2013.01); *F24H 1/206* (2013.01)
USPC ....................................... 122/14.22; 700/300

(58) Field of Classification Search
USPC ........ 122/14.2, 14.22; 392/498; 700/299, 300
See application file for complete search history.

(56) References Cited

U.S. PATENT DOCUMENTS

| | | | |
|---|---|---|---|
| 3,847,350 A | 11/1974 | Thompson | |
| 3,849,350 A | 11/1974 | Matsko | |

(Continued)

FOREIGN PATENT DOCUMENTS

| | | |
|---|---|---|
| EP | 0356609 | 3/1990 |
| EP | 0699316 | 7/1999 |

(Continued)

OTHER PUBLICATIONS

Lennox, "Network Control Panel, User's Manual," 18 pages, Nov. 1999.

(Continued)

*Primary Examiner* — Gregory A Wilson
(74) *Attorney, Agent, or Firm* — Seager Tufte & Wickhem LLC.

(57) ABSTRACT

Methods and systems for operating a water heater to limit the effects of stacking in a water heater tank are disclosed. In some cases, the water heater controller may determine a rate of change of the water temperature in the water heater tank. If the rate of change exceeds a threshold value, the controller may adjust the water heater temperature set point downward to help reduce stacking in the water heater. In some cases, the water heater temperature set point may be returned to the original water heater temperature set point when stacking is no longer likely to be of a concern. In one illustrative embodiment, the controller may track the time that the heater of the water heater is in the "on" state, or the time that the heater is in the "off" state, during subsequent heating cycles. The controller may then compare the "on" time or the "off" time to respective recovery threshold times. If the "on" time or the "off" time exceeds its respective recovery threshold time, then the controller may adjust the set point toward the original water heater temperature set point, sometimes in an incremental manner.

14 Claims, 7 Drawing Sheets

(56) References Cited

U.S. PATENT DOCUMENTS

| | | | | |
|---|---|---|---|---|
| 4,305,547 | A | 12/1981 | Cohen | |
| 4,324,944 | A | 4/1982 | Weihrich et al. | |
| RE30,936 | E | 5/1982 | Kmetz et al. | |
| 4,333,002 | A | 6/1982 | Kozak | |
| 4,467,178 | A | 8/1984 | Swindle | |
| 4,508,261 | A | 4/1985 | Blank | |
| 4,511,790 | A | 4/1985 | Kozak | |
| 4,568,821 | A | 2/1986 | Boe | |
| 4,588,875 | A | 5/1986 | Kozak et al. | |
| 4,692,598 | A | 9/1987 | Yoshida et al. | |
| 4,696,639 | A | 9/1987 | Bohan, Jr. | |
| 4,734,658 | A | 3/1988 | Bohan, Jr. | |
| 4,742,210 | A | 5/1988 | Tsuchiyama et al. | |
| 4,770,629 | A | 9/1988 | Bohan, Jr. | |
| 4,834,284 | A | 5/1989 | Vandermeyden | |
| 4,984,981 | A | 1/1991 | Pottebaum | |
| 4,986,468 | A | 1/1991 | Deisinger | |
| 5,007,156 | A | 4/1991 | Hurtgen | |
| 5,103,078 | A | 4/1992 | Boykin et al. | |
| 5,442,157 | A | 8/1995 | Jackson | |
| 5,622,200 | A | 4/1997 | Schulze | |
| 5,660,328 | A | 8/1997 | Momber | |
| 5,779,143 | A | 7/1998 | Michaud et al. | |
| 5,797,358 | A | 8/1998 | Brandt et al. | |
| 5,896,089 | A | 4/1999 | Bowles | |
| 5,968,393 | A * | 10/1999 | Demaline | 219/492 |
| 5,975,884 | A | 11/1999 | Dugger | |
| 6,053,130 | A | 4/2000 | Shellenberger | |
| 6,059,195 | A | 5/2000 | Adams et al. | |
| 6,069,998 | A | 5/2000 | Barnes et al. | |
| 6,075,923 | A | 6/2000 | Wu | |
| 6,208,806 | B1 | 3/2001 | Langford | |
| 6,212,894 | B1 | 4/2001 | Brown et al. | |
| 6,261,087 | B1 | 7/2001 | Bird et al. | |
| 6,271,505 | B1 | 8/2001 | Henderson | |
| 6,293,471 | B1 | 9/2001 | Stettin et al. | |
| 6,350,967 | B1 | 2/2002 | Scott | |
| 6,363,218 | B1 | 3/2002 | Lowenstein et al. | |
| 6,375,087 | B1 | 4/2002 | Day et al. | |
| RE37,745 | E | 6/2002 | Brandt et al. | |
| 6,455,820 | B2 | 9/2002 | Bradenbaugh | |
| 6,560,409 | B2 * | 5/2003 | Troost, IV | 392/498 |
| 6,629,021 | B2 | 9/2003 | Cline et al. | |
| 6,633,726 | B2 | 10/2003 | Bradenbaugh | |
| 6,701,874 | B1 | 3/2004 | Schultz et al. | |
| 6,795,644 | B2 | 9/2004 | Bradenbaugh | |
| 6,861,621 | B2 | 3/2005 | Ghent | |
| 6,880,493 | B2 | 4/2005 | Clifford | |
| 6,934,862 | B2 | 8/2005 | Sharood et al. | |
| 6,936,798 | B2 | 8/2005 | Moreno | |
| 6,955,301 | B2 | 10/2005 | Munsterhuis et al. | |
| 6,959,876 | B2 | 11/2005 | Chian et al. | |
| 6,967,565 | B2 | 11/2005 | Lingemann | |
| 7,032,542 | B2 | 4/2006 | Donnelly et al. | |
| 7,065,431 | B2 | 6/2006 | Patterson et al. | |
| 7,088,238 | B2 | 8/2006 | Karaoguz et al. | |
| 7,103,272 | B2 | 9/2006 | Baxter | |
| 7,117,825 | B2 * | 10/2006 | Phillips | 122/4 A |
| 7,221,862 | B1 | 5/2007 | Miller et al. | |
| 7,252,502 | B2 | 8/2007 | Munsterhuis | |
| 7,317,265 | B2 | 1/2008 | Chian et al. | |
| 7,373,080 | B2 | 5/2008 | Baxter | |
| 7,380,522 | B2 * | 6/2008 | Krell et al. | 122/14.2 |
| 7,432,477 | B2 | 10/2008 | Teti | |
| 7,603,204 | B2 | 10/2009 | Patterson et al. | |
| 8,111,980 | B2 * | 2/2012 | Bradenbaugh | 392/478 |
| 8,165,726 | B2 * | 4/2012 | Nordberg et al. | 700/300 |
| 8,422,870 | B2 * | 4/2013 | Nelson et al. | 392/461 |
| 2003/0093186 | A1 | 5/2003 | Patterson et al. | |
| 2004/0042772 | A1 | 3/2004 | Whitford et al. | |
| 2005/0077368 | A1 * | 4/2005 | Zak et al. | 237/19 |
| 2005/0150967 | A1 | 7/2005 | Chapman, Jr. et al. | |
| 2007/0023333 | A1 | 2/2007 | Mouhebaty et al. | |
| 2007/0034169 | A1 * | 2/2007 | Phillips | 122/14.1 |
| 2007/0084419 | A1 | 4/2007 | Krell et al. | |
| 2007/0183758 | A1 * | 8/2007 | Bradenbaugh | 392/478 |
| 2007/0191994 | A1 | 8/2007 | Patterson et al. | |
| 2007/0246551 | A1 | 10/2007 | Phillips et al. | |
| 2007/0295823 | A1 | 12/2007 | Yamada et al. | |
| 2008/0023564 | A1 | 1/2008 | Hall | |
| 2008/0188995 | A1 | 8/2008 | Hotton et al. | |
| 2009/0120380 | A1 * | 5/2009 | Chian et al. | 122/14.1 |
| 2010/0209084 | A1 * | 8/2010 | Nelson et al. | 392/465 |
| 2012/0145095 | A1 * | 6/2012 | Nelson et al. | 122/15.1 |
| 2013/0092102 | A1 * | 4/2013 | Chaudhry | 122/14.22 |

FOREIGN PATENT DOCUMENTS

| | | |
|---|---|---|
| GB | 2211331 | 6/1989 |
| JP | 8264469 | 10/1996 |
| JP | 2008008548 | 1/2008 |

OTHER PUBLICATIONS

Moog, "M3000 Control System, RTEMP 8, Remote 8-Channel Temperature Controller with CanOpen Interface," 6 pages, Nov. 2004.

* cited by examiner

WATER HEATER STACKING DETECTION AND CONTROL

This application is a continuation of U.S. patent application Ser. No. 11/764,940, filed Jun. 19, 2007, entitled "Water Heater Stacking Detection and Control", which is incorporated herein by reference.

FIELD

The present invention relates generally to water heaters, and more particularly, to controllers and methods for controlling water heaters.

BACKGROUND

Water heaters are commonly used in homes, businesses and just about any establishment that has a need for heated water. Water heaters often heat water using the simple "heat rises" principle. In operation, water heaters typically heat cold or ambient temperature water entering at or near the bottom of the water heater tank to a desired temperature using a gas-fired burner, an electric heater or some other heater element. During a heating cycle, the cold or ambient temperature water at or near the bottom of the water heater tank becomes hotter and begins to rise towards the top of the water heater tank. Cooler and denser water, once on top of the water being heated, falls toward the bottom of the water heater tank so that it can be heated or reheated to the desired temperature. After the temperature of the water at the bottom of the water heater tank reaches a certain desired temperature, the water heater typically stops heating the water for a period of time.

A conventional water heater typically has at least one heating element or "heater," such as a gas-fired and/or electric burner. To take advantage of the "heat-rises" principle, the heater is typically located at or near the bottom of the water heater tank. A sensor is often provided at or near the bottom end of the water heater tank to sense the temperature of the water. A thermostat or controller is often coupled to the sensor and the heater, and is programmed to control the heater to a water temperature set point based on the sensed temperature.

During operation, when demand for hot water arises (e.g., someone turns on a faucet), fresh, cold or ambient temperature water typically enters the water heater tank at or near the bottom of the water heater tank, and "pushes out" or supplies the hotter water at or near the top of the water heater tank to service the hot water request. Eventually, the fresh, cold or ambient temperature water entering the bottom of the water heater tank causes the temperature of the water at the bottom of the water heater tank to drop below the water temperature set point. The sensor detects when this occurs, and the controller typically turns on and repeats the heat cycling described above to maintain a water temperature at or near the water temperature set point.

Under certain condition, such as when short water draws occur, the water temperature near the top of the water heater tank can increase well above the water temperature set point, which is sometimes referred to as "stacking". "Stacking" occurs when hotter water located at the top of the water heater tank become "stacked" on top of colder water at the bottom of the tank. In some cases, the water at or near the top of the water heater tank may become substantially hotter than the lower, safer temperature water at or near the bottom of the water heater tank.

Water heaters with a single temperature sensor located at or near the bottom of the water heater tank may be particularly susceptible to stacking. The temperature sensor may sense the water temperature at or near the bottom of the water heater tank, which during stacking is less than the water temperature set point, even though the water at or near the top of the water heater tank may be substantially hotter than the water temperature set point. In response, the controller often turns on the heating element of the water heater. Because only a relatively small amount of colder water may be located at or near the bottom of the water heater tank, particularly in short water draw situations, the resulting heating cycles may be relatively short. Also, the heating cycles may occur relatively often. This operation can create and/or exacerbate water "stacking" in the water heater, which in many cases, is undesirable.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

The present invention relates generally to water heaters, and more particularly, to controllers and methods for controlling water heaters. In one illustrative embodiment, a method of operating a water heater to limit the effects of stacking may include sensing the temperature of the water in the water heater tank with a sensor, determining if stacking is likely to be occurring in the water heater tank using the sensed water temperature, and adjusting the water temperature set point if stacking is occurring in the water heater tank. In some cases, the water temperature set point may be lowered if stacking is likely to be occurring, at least temporarily. In some cases, the controller may determine if stacking is likely to be occurring in the water heater by comparing the rate of change of the water temperature sensed by the sensor with a threshold rate of change (or other value).

In one illustrative embodiment, a controller may monitor not only the temperature of the water at or near the bottom of a water heater tank, but also the temperature change rate. The controller may be configured to activate a heating element to control the temperature of the water at or near the bottom of a water heater tank in accordance with a normal temperature set point, which can be set by an installer or user. The controller may use the temperature change rate to determine if stacking in the water heater is likely to be occurring (e.g. an active water draw is occurring that might cause or exacerbate stacking in the water heater), and if so, reducing the temperature set point used by the controller, at least temporarily. For example, if the controller determines that the temperature change rate exceeds a threshold (or other) value, then the controller may reduce the normal temperature set point of the water heater, or otherwise control to a lower set point (e.g. by adjusting the normal temperature set point by an offset), at least temporarily. Alternatively, or in addition, the controller may use a change in the temperature change rate (e.g. acceleration in temperature change) when deciding whether to adjust the normal temperature set point of the water heater, as desired.

After the controller reduces the temperature set point in an effort to help reduce stacking in the water heater, the controller may later return to the normal temperature set point when stacking is less of a concern. For example, and in one illustrative embodiment, the controller may monitor the time that the heater element is on during a heating cycle and, if the time exceeds a burner on time threshold value (or other value), the controller may adjust the temperature set point toward the normal temperature set point or otherwise control to a higher set point (e.g. adjust a set point offset toward zero). Alternatively, or in addition, the controller may monitor the time that the heater element is off between heating cycles and, if the time exceeds a burner off time threshold value (or other value), the controller may adjust the temperature set point toward the normal temperature set point or otherwise control to a higher set point (e.g. adjust a set point offset toward zero). These are only illustrative, and a full appreciation of the invention can be gained by taking the entire specification, claims, drawings, and abstract as a whole.

BRIEF DESCRIPTION

The invention may be more completely understood in consideration of the following detailed description of various illustrative embodiments of the invention in connection with the accompanying drawings, in which.

DETAILED DESCRIPTION

Figure 1:
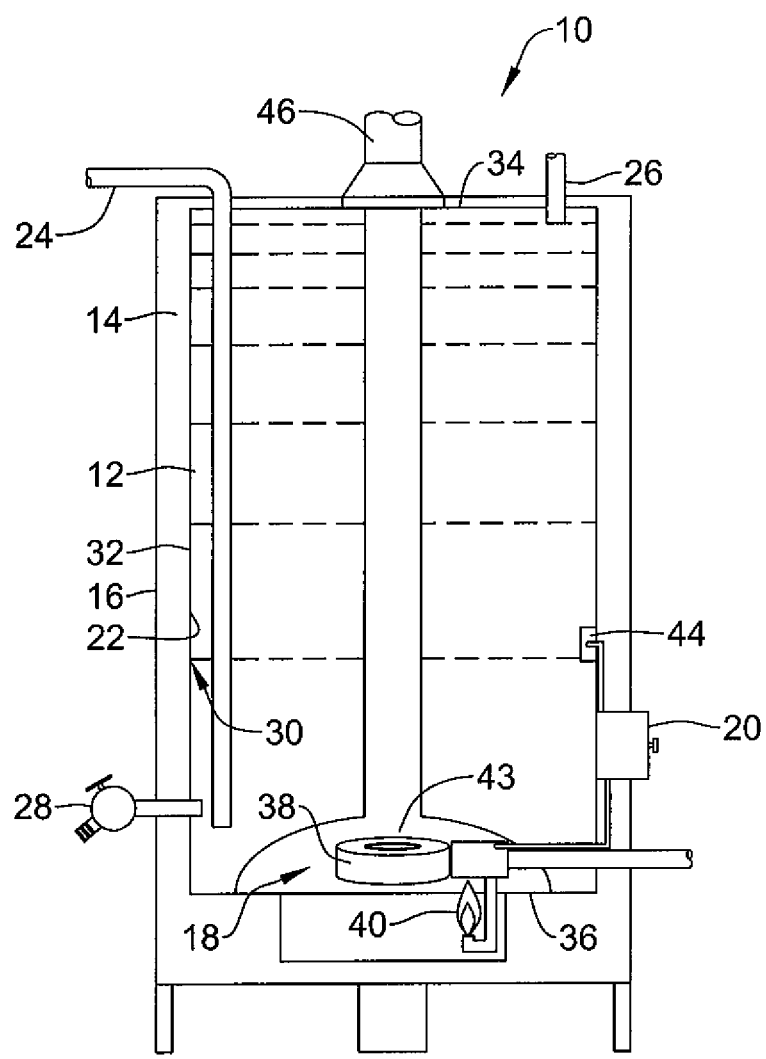
FIG. 1 is cutaway side view of an illustrative water heater.

The following description should be read with reference to the drawings wherein like reference numerals indicate like elements throughout the several views. The detailed description and drawings show several embodiments which are meant to be illustrative of the claimed invention.

The present invention relates generally to water heaters, and more particularly, to controllers and methods for controlling water heaters. FIG. 1 is cutaway view of an illustrative water heater 10. The illustrative water heater 10 includes a tank 12, an insulating layer 14, an external shell 16, a heater 18, and a controller 20. Tank 12 holds water that is to be heated and may be constructed of steel or other heat conducting material. Illustrative tank 12 has an inner surface 22, an input supply tube or dip tube 24, an output conduit or pipe 26, a drainage valve 28, a rust inhibiting liner 30, and an outer surface 32.

Insulating layer 14 may be located between outer surface 32 of tank 12 and external shell 16. Insulating layer 14 limits or otherwise minimizes the heat loss of the heated water from passing from tank 12 to the outside world. Bonded to the inside of inner surface 22 is rust inhibiting liner 30. In addition, tank 12 may have a sacrificial anode rod (not illustrated) to keep tank 12 from corroding.

Tank 12 also has a top surface 34 and a bottom surface 36. In the illustrated embodiment, dip tube 24 and output pipe 26 pass through top surface 34. Output pipe 26 extends through top surface 34 to a first predetermined distance from bottom surface 36. This first predetermined distance may result in the output pipe 26 to be fairly close to top surface 34. Positioning output pipe 26 close to top surface 34 allows the hotter water, which may be the hottest water in tank 12, to exit upon demand. In operation, when the hot water is demanded, fresh water flows into dip tube 24 at or near the bottom of tank 12 and pushes or otherwise causes the hotter water at the top of tank 12 to exit through output pipe 26.

Dip tube 24 extends through top surface 34 to a second predetermined distance from bottom surface 36. The second predetermined distance may result in the dip tube 24 extending fairly close to bottom surface 36. Positioning the exit of dip tube 24 close to bottom surface 36 allows the fresh, cold or ambient water to enter tank 12 near bottom surface 36. This helps prevent the cold or ambient water from mixing and cooling the hotter water near top surface 34. In practice, dip tube 24 may be located about three quarters of the distance between top surface 34 and the bottom surface 36. Because the cooler water entering tank 12 is denser than heated water, the cooler water tends to sink to the bottom of tank 12, where it may be heated by heater 18.

Heater 18 heats tank 12, which in turn heats any water inside tank 12. Heater 18 may be a gas-fired heater, an electric heater, a plurality of gas-fired burners, a plurality of electric heaters, a combination of gas-fired and electric heaters or any other heat source, as desired.

In the exemplary gas-fired water heater 10 shown in FIG. 1, heater 18 may have a gas-flow valve (not shown), a burner 38 and an ignition source 40. The gas-flow valve may be a solenoid-controlled valve, a linear actuated valve, a motor actuated valve, or any other valve capable of supplying and/or regulating gas flow to burner 38. Ignition source 40 may be a pilot light, a solid-state igniter, an electric heat element, or any other ignition source capable of igniting the gas.

The heat output of heater 18 may be controlled by burner orifice size, gas pressure, and/or time. To produce heat in the illustrative gas-fired water heater, gas flows into burner 38 in the combustion chamber 43 through the gas-flow valve, where ignition source 40 ignites the gas. The gas will continue to burn until the supply of gas is terminated. The burner 38, which is situated in combustion chamber 43, may be in fluid communication with an exhaust outlet, such as a flue 46. The flue 46 may be coupled to a vent pipe (not shown) that vents combustion gases exiting from the combustion chamber 43 to atmosphere (e.g. outside of the building).

In an alternative water heater embodiment (not shown), the heat output may be controlled by an electric current flow through a resistive heating element. To produce heat in an electric heater, the amount of current provided through the resistive heating element may be regulated. In regulating the heat output, the more current impressed on the electric heating element, the more heat is produced. Conversely, less or no heat is produced if the current is reduced or turned off, respectively.

The illustrative water heater 10 includes a sensor 44. Sensor 44 may be a temperature sensor, or another device capable of sensing a measure of water temperature at or near the bottom of tank 12. In an exemplary embodiment, sensor 44 may be located towards bottom surface 36 and towards the exit of dip tube 24. Sensor 44, however, need not be located in such position, provided that sensor 44 is able to sense the water temperature at or near the bottom of tank 12. In other embodiments, sensor 44 may be located in a position to sense the water temperature at any location within the tank 12, as desired.

In the illustrative embodiment, sensor 44 may provide a signal representing detected water temperature values to controller 20. Controller 20 may receive signals from sensor 44, and may, in response to these signals, produce an output to initiate, maintain and/or terminate a heating cycle. During a heating cycle, controller 20 may, for example, regulate gas flow to burner 38 or electric current to a resistive heating element (not shown). When gas is supplied to burner 38, controller 20 may instruct or trigger ignition source 40 to ignite the gas, if ignition source 40 requires such trigger. Burner 38 then burns the gas until the demand for heat ceases.

In the illustrative embodiment of FIG. 1, once the heat demand ceases, controller 20 may shut off the gas supply, thereby extinguishing burner 38. For some cases, controller 20 may modulate the flow of gas to burner 38 to thereby modulate the heat output of burner 38. If water heater 10 is instead electrically heated, it will be recognized that controller 20 may control the heating cycle of the one or more electrical heating elements.

Controller 20 may control the heater 18 (e.g. activate, maintain, terminate, etc.) according to a temperature set point. In some cases, the set point may be a normal temperature set point that is user adjustable, such as, for example, via a control knob (not shown). When the controller 20 detects a water temperature in the tank 12 below the normal temperature set point, controller 20 can activate the heater 18.

In some embodiments, controller 20 may include a differential value. In these embodiments, controller 20 can activate the heater 18 when the water temperature is below the set point minus the differential. Controller 20 can then terminate the heating cycle when the water temperature reaches the set point. In this embodiment, controller 20 can control the water temperature with the range of the normal temperature set point minus the differential to the set point.

In one example case, the normal temperature set point may be, for example, 135 degrees Fahrenheit and the differential may be 10 degrees. In this example case, the controller 20 may activate the heater 18 to initialize a heating cycle when the water temperature of the tank falls below 125 degrees Fahrenheit and may terminate the heating cycle when the temperature reaches 135 degrees Fahrenheit. However, any suitable normal temperature set point and differential may be used, as desired.

In one alternative embodiment, controller 20 may include multiple set points. For example, controller 20 may initiate a heating cycle with a first, lower set point and may terminate the heating cycle with a second, higher set point, if desired.

The foregoing water heater is merely illustrative and is not meant to be limiting. It is contemplated that the present invention may be incorporated into any suitable water heater, as desired.

Figure 2:
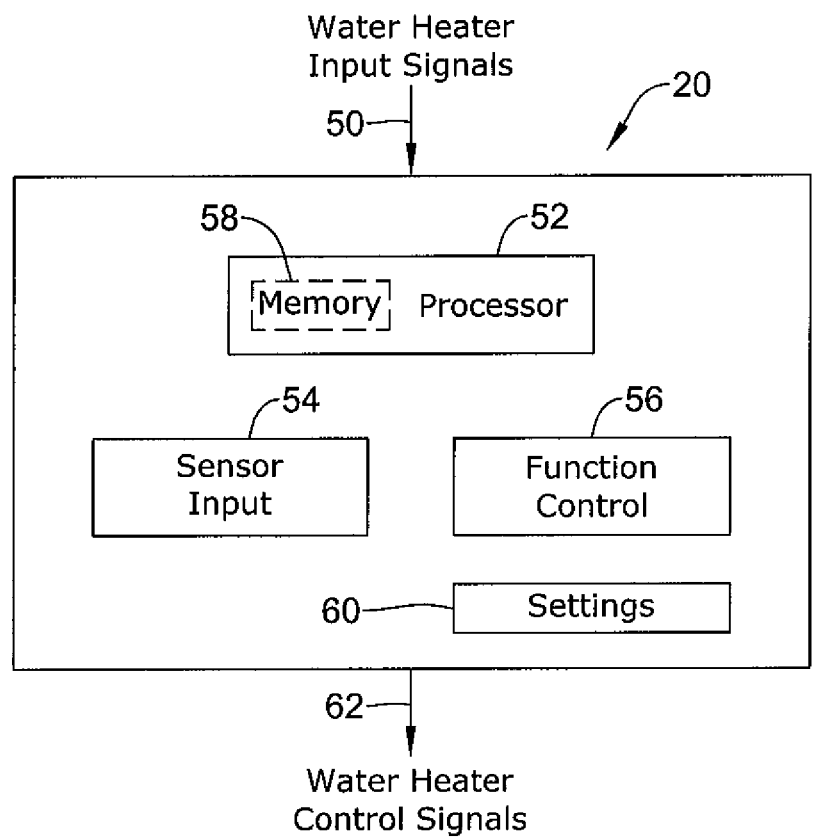
FIG. 2 is a block diagram of an illustrative controller for the water heater of FIG. 1.

FIG. 2 is a block diagram of the illustrative controller 20 for operating and/or controlling the water heater 10. The illustrative controller 20 includes a sensor input block 54, a function control block 56, a processing block 52, a memory block 58, and a setting block 60. The functions of the illustrative controller 20 may be implemented in hardware, software or a combination thereof. Under some circumstances, the sensor input block 54, the function control block 56, the processing block 52, the memory block 58, and/or the settings block 60 may be integrated on a single device platform, but this is not required in all embodiments.

In the illustrative embodiment, the controller 20 may control the operation of the water heater 10. For example, the controller 20 may control the ignition source or pilot of the water heater, control the opening and closing of a gas valve, control the opening and closing of an optional flue damper (not shown), control the set point of the water in the tank, and/or control the operation of other components, depending on the application. The controller 20 may provide one or more water heater control signals, as shown at 62, to various components of the water heater 10, and may receive one or more water heater input signals 50 from water heater 10, such as one or more sensor (e.g. temperature sensor 44) input signals, one or more user interface input signals, etc.

The processing block 52 of the controller 20 may, in some cases, process one or more of the input signals 50, and in response, provide appropriate control signals 62 to the various water heater 10 components, sometimes through the function control block 56. For example, and in some cases, the function control block 56 may be adapted to control the ignition of the burner and/or the ignition source by either allowing ignition of the water heater 10 or not allowing ignition of the water heater 10. It is contemplated that the processing block 52 may include a microprocessor, but this is not required.

The illustrative controller 20 also includes a settings block 60 that may permit a user to input various parameters. Settings block 60 may be in communication with a control knob, a keypad or any other input devices, depending on the application. If, for example, controller 20 is being used with a water heater 10, settings block 60 may accept a user-defined normal temperature set point from a control knob or the like.

The sensor input block 54 may be in communication with and, in some cases, coupled to one or more sensors, such as temperature sensor 44 (shown in FIG. 1). Sensor input block 54 can receive a signal from the sensor 44 corresponding to the temperature of the water in the tank. The sensor input block 54 may be internal, or coupled to, the processing block 52 of the controller 50, if desired. Under some circumstances, the sensor input block 54 may be a sensing circuit, which may provide an electrical signal to the processing block 52 that indicates the temperature of the water in the tank.

Memory block 58 may be in communication with and, in some cases, coupled to the processing block 52. In some cases, memory block 58 may be internal to the processing block 52, but this is not required. Memory block 58 may include RAM, ROM, Flash memory, or any other suitable memory, as desired. In some cases, memory block 58 may store values corresponding to a normal temperature set point, a set point differential, a set point offset, a set point recovery offset, a burn recovery delay, an offset recovery time delay, a burn recovery time, an offset recovery time, a burn recovery step, an offset recovery time step, and/or other preset and/or real time values, as desired.

In operation, processing block 52 may be able to determine if stacking is likely to be occurring in the water heater tank. To determine if stacking is likely to be occurring, and in one illustrative embodiment, processing block 52 may determine the rate of change of the water temperature in the tank adjacent to the sensor. For example, to determine the rate of change of the water temperature adjacent to the sensor, the controller 20 may receive a first signal from the sensor via sensor input block 54 corresponding to the water temperature at a first time. In some cases, the water temperature and the time may be stored in memory 58, but this is not required. Then, after a period of time, controller 20 may receive a second signal from the sensor via sensor input block 54 corresponding to the water temperature at a second time. Using the change in the water temperature and the time difference between the two temperatures, processing block 52 may be able to determine the rate of change of the water temperature adjacent to the sensor in the water heater tank. In some cases, controller 20 may also determine and use a change in the rate of change of the water temperature adjacent to the sensor in the water heater tank, but this is not required in all embodiments.

To determine if stacking is occurring in the water heater tank, processing block 52 may compare the rate of change of the water temperature to a stacking rate of change threshold value (or other value). If the rate of change of the water temperature exceeds the stacking rate of change threshold value, the processing block 52 may determine that stacking is likely to occur in the water heater tank. This is likely to occur when, for example, a number of short water draws are made from the water tank.

In some cases, the stacking rate of change threshold value may be a preset value, a computed value, a user defined value, or any other value, as desired. In some cases, the stacking rate of change threshold value may be any value from, for example, 0.1 degrees Fahrenheit per second to 10 degrees Fahrenheit per second. In one illustrative case, the stacking rate of change threshold value may be 0.25 degrees Fahrenheit per second. It is contemplated, however, that this is only an example, and that the stacking rate of change threshold value may be any suitable value, depending on the application.

When processing block 52 determines that stacking is likely occurring, processing block 52 may adjust the normal temperature set point by an offset value. In some cases, the controller 20 may control to a new set point that may be defined as the normal user-defined temperature set point minus the offset. In this case, when stacking is not detected by controller 20, the offset may be equal to zero. However, it is contemplated that a stacking set point value may be stored in memory based on the normal user-defined temperature set point and when stacking is likely to be present, the controller may control to the stored stacking set point value.

In some cases, the offset value may be a preset value, a user defined value, or a variable value determined by the rate of change of the water temperature, as desired. In some cases, the offset may be from 1 degree to 20 degrees, as desired. In one case, the offset may be 9 degrees. In some cases, the offset value may be formula based on, for example, the water temperature differential minus a value. However, it is contemplated that any suitable offset may be used, as desired. Furthermore, it is contemplated that the set point may be defined as the normal user-defined temperature set point plus the offset. In this case, the offset would be a negative value under most operating conditions.

During subsequent operation of the water heater, processing block 52 may control the operation of the water heater, such as, ignition of the burner and/or ignition source via function block 56, using to the adjusted set point (e.g. the normal user defined temperature set point minus the offset).

Controller 20 may also determine if it is likely that the water heater tank has sufficiently recovered from stacking. For example, the processing block 52 may monitor the time that the burner is activated or deactivated during subsequent heating cycles. In some cases, if the burner "on" time exceeds a burner on recovery time or, in other cases, if the burner off time exceeds a burner off recovery time, then the processing block 52 may determine that the tank is likely to have recovered from stacking. Processing block 52 may then adjust the offset (decrease the offset if positive or increase the offset if negative) by a recovery offset value during each subsequent heating cycle until the offset value is zero. In some cases, the recovery from stacking may be performed in multiple iterations gradually adjusting the offset toward the normal user-defined temperature set point.

Figure 3:
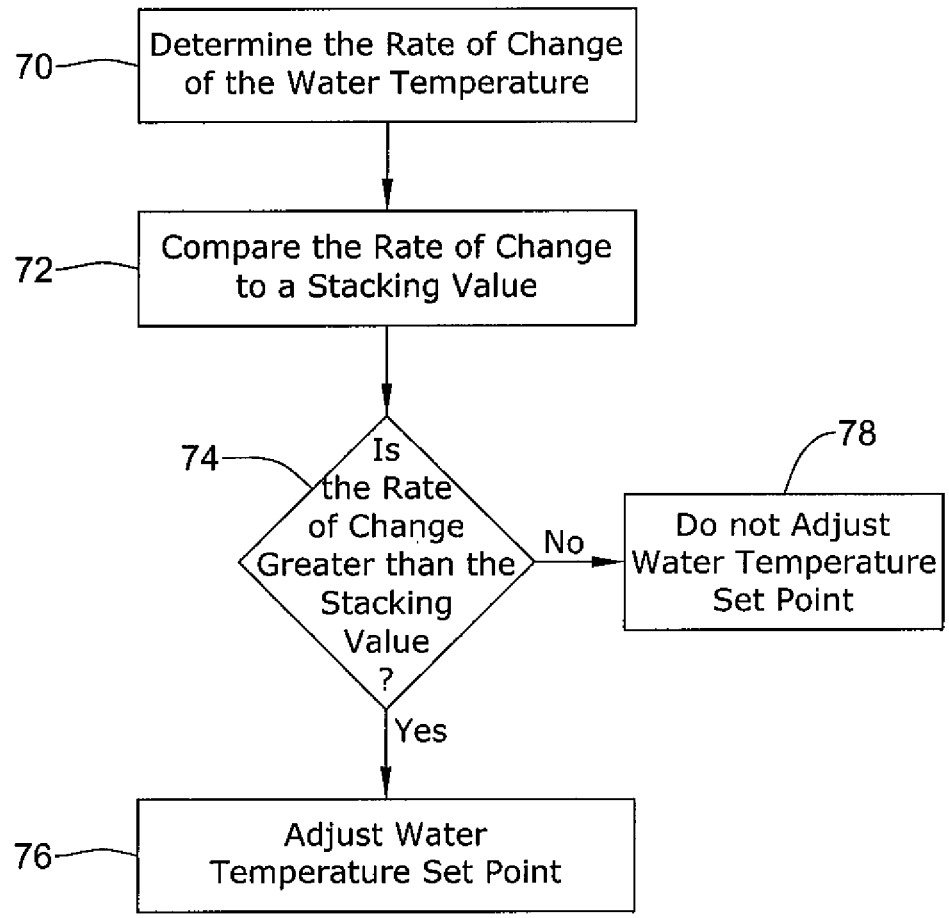
FIG. 3 is a flow diagram of an illustrative method for detecting stacking in the water heater of FIG. 1.

FIG. 3 is a flow diagram of an illustrative method for detecting stacking in the water heater of FIG. 1. In block 70, the controller may determine the rate of change of the water temperature in the tank of the water heater. In some cases, the rate of change of the water temperature in the tank may be the rate of change of the water temperature in the tank adjacent to the sensor 44, which, in some cases, may be positioned towards the bottom end of the tank. In one example method of determining the rate of change of the water temperature, the controller may receive a first signal from the sensor corresponding to the water temperature at a first time. In some cases, this water temperature and time may be stored in memory, but this is not required. Then, after a period of time, controller may receive a second signal from the sensor corresponding to the water temperature at a second time. Using the change in the water temperature from the first signal to the second signal along with the period of time between the first signal and the second signal, the controller may determine the rate of change of the water temperature adjacent to the sensor in the water heater tank. It is contemplated, however, that the controller may use any suitable method of determining a rate of change of the water temperature in the water tank, as desired. For example, the controller may determine the difference in temperature between the first signal from the sensor and the second signal of the sensor, and then compare that difference to the stacking rate of change threshold value multiplied by the time difference between the first signal and the second signal, if desired. Moreover, and in some embodiments, controller 20 may also determine and use a change in the rate of change of the water temperature adjacent to the sensor in the water heater tank, but this is not required in all embodiments.

Next, in block 72, the controller may compare the rate of change to a stacking rate of change threshold value. In some cases, the stacking rate of change threshold value may be 2 degrees Fahrenheit per second, 1.5 degrees Fahrenheit per second, 1 degree Fahrenheit per second, 0.75 degrees Fahrenheit per second, 0.5 degrees Fahrenheit per second, or 0.25 degrees Fahrenheit per second. These are only illustrative, and it is contemplated that any suitable stacking rate of change threshold value may be used, as desired.

In decision block 74, the controller may determine if the rate of change of the water temperature is greater than the stacking rate of change threshold value. If the rate of change of the water temperature exceeds the stacking rate of change threshold value, then it is determined that stacking is likely to be occurring, and, as indicated in block 76, the controller may adjust the water temperature set point (e.g. increase the offset). For example, if the normal user-defined temperature set point is 135 degrees Fahrenheit, then the controller may adjust the offset to be 9 degrees. In this example case, the adjusted set point would be 126 degrees Fahrenheit (i.e. 135 degrees Fahrenheit minus 9 degrees Fahrenheit).

If, however, the rate of change of the water temperature does not exceed the stacking rate of change threshold value, as determined in decision block 74, then the controller may determine that an insufficient amount of stacking is likely occurring. Then, as indicated in block 78, the controller may not adjust the water temperature set point (e.g. not adjust the offset).

Figure 4:
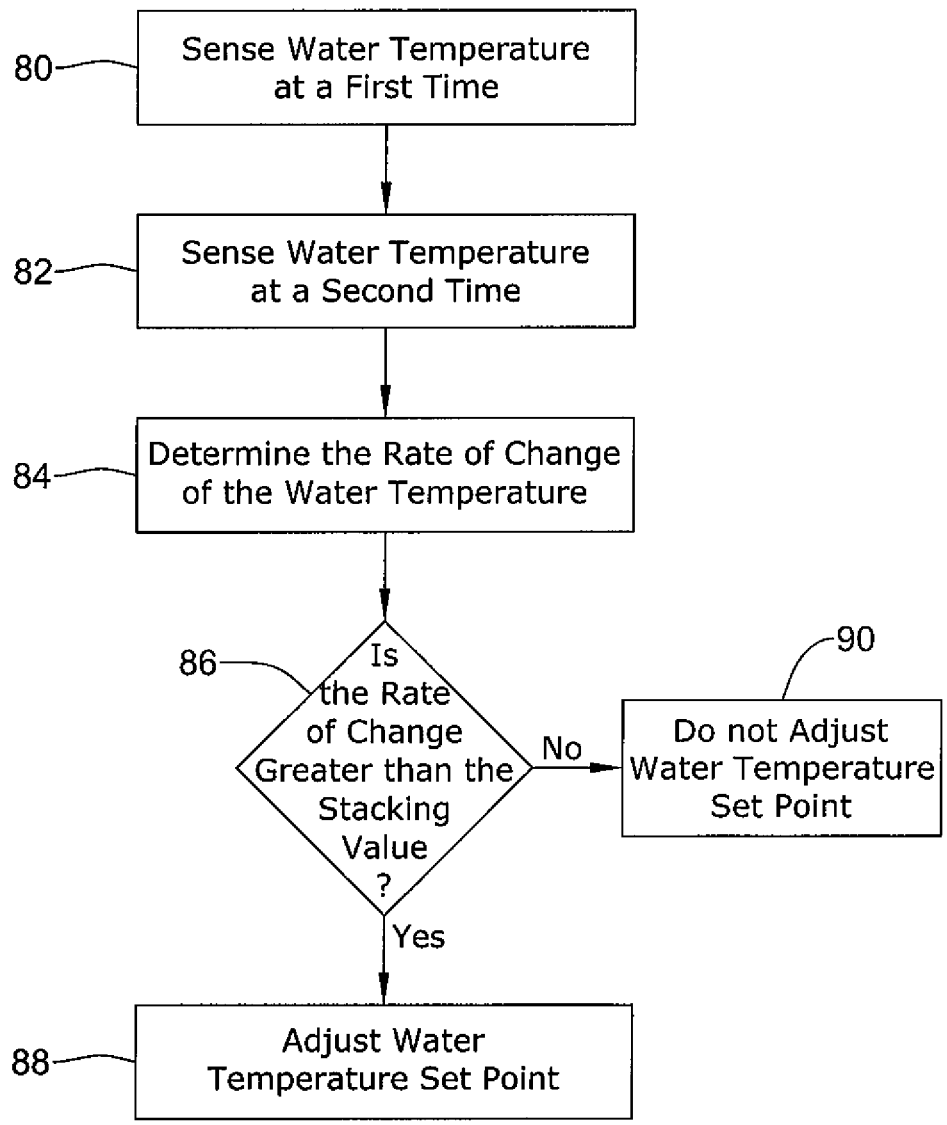
FIG. 4 is a flow diagram of an illustrative method for detecting stacking in the water heater of FIG. 1.

FIG. 4 is a flow diagram of an illustrative method for detecting stacking in the water heater of FIG. 1. In block 80, controller may receive a first signal from the sensor corresponding to the water temperature at a first time. In some cases, this water temperature and time may be stored in memory, but this is not required. Then, in block 82, controller may receive a second signal from the sensor corresponding to the water temperature at a second time. In some cases, this water temperature and time may be stored in memory, but this is not required.

Next, in block 84, the controller may determine the rate of change of the water temperature in the tank. To do this, and in some embodiments, the controller may determine the difference between the temperature of the water from the first signal and the temperature of the water from the second signal. To get the rate of change, the controller may divide this difference by the difference in time between the two signals. However, it is contemplated that the controller may use any suitable method of determining the rate of change of the water temperature, as desired. For example, it is contemplated that controller may determine the difference in temperature between the first signal from the sensor and the second signal of the sensor, and then compare that difference to the stacking rate of change threshold value multiplied by the time difference between the first signal and the second signal, if desired.

In decision block 86, the controller can compare the rate of change of the water temperature to a stacking rate of change threshold value. In some cases, the stacking rate of change threshold value may be 2 degrees Fahrenheit per second, 1.5 degrees Fahrenheit per second, 1 degree Fahrenheit per second, 0.75 degrees Fahrenheit per second, 0.5 degrees Fahrenheit per second, or 0.25 degrees Fahrenheit per second. It is contemplated, however, that any suitable stacking rate of change threshold value or other value may be used, as desired.

If the rate of change of the water temperature is greater than the stacking rate of change threshold value, then, in block 88, the controller may adjust the water temperature set point (e.g. adjust the offset). If, however, the rate of change of the water temperature is not greater than the stacking rate of change threshold value, then, in block 78, the controller may not adjust the water temperature set point (e.g. do not adjust the offset).

Figure 5:
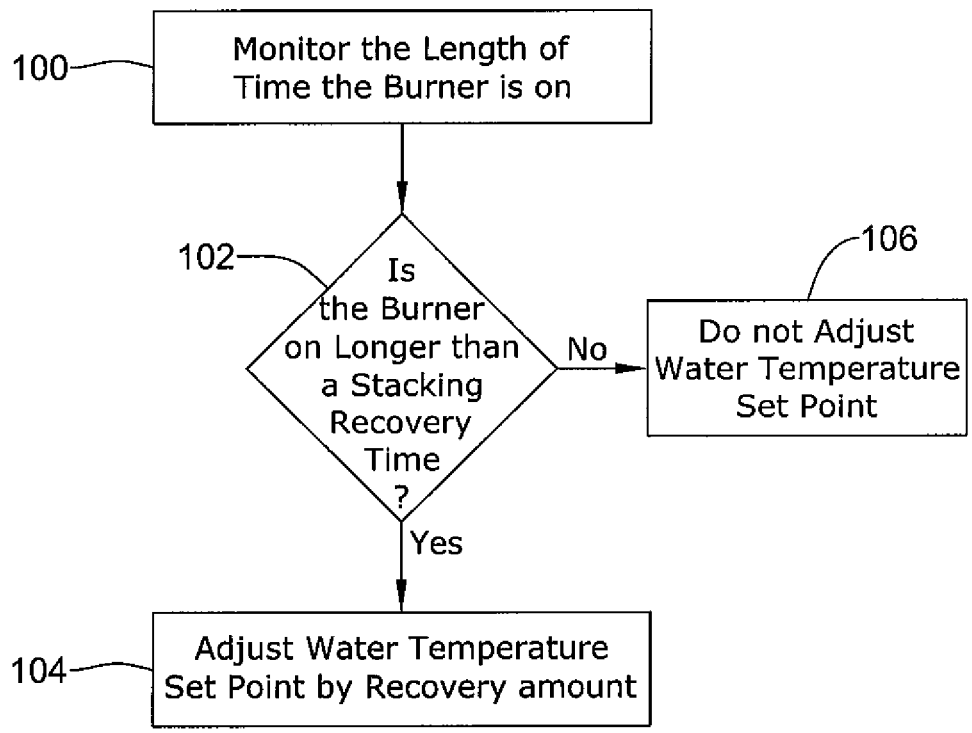
FIG. 5 is a flow diagram of an illustrative method of recovering from stacking in the water heater of FIG. 1.

FIG. 5 is a flow diagram of an illustrative method of recovering from stacking in the water heater of FIG. 1. After the controller has detected that stacking is likely occurring in the water heater, and has adjusted the offset to be non-zero, the controller may monitor the water heater tank to determine when the effects of stacking likely have dissipated. This illustrative method may provide a method of recovering from stacking.

In block 100, the controller may monitor the length of time that the burner has been on during a subsequent heating cycle. In some cases, the controller, such as the processing block of the controller, may include a clock or timer that may be able to monitor and/or count the time that the burner has been activated.

Next, in decision block 102, the controller may determine if the burner has been activated for a period of time that is greater than a burner on recovery time. In some cases, the burner on recovery time may be a value stored in the memory block of the controller, but this is not required. In some cases, the burner on recovery time may be in the range of 100 seconds to 100,000 seconds. In one illustrative example, the burner on stacking recovery time may be 3,600 seconds. It is contemplated, however, that the burner on stacking recovery time may any suitable period of time, depending on the application.

If the burner has been activated for a period of time that is greater than the burner on recovery time, then, in block 104, the controller may adjust the water temperature set point (e.g. offset) by a burner on recovery offset step. In some cases, the burner on recovery offset step may be a value less than the offset. However, it is contemplated that any suitable burner on recovery offset step may be used, as desired. For example, if the offset value of 9 is stored in memory after stacking was detected, the burner on recovery offset step may adjust the offset towards zero in incremental steps, such as, for example, 3 degree steps. In this example case, the offset would be adjusted to 6 degrees during each successive heating cycle. However, it is contemplated that the offset may be adjusted to recover from stacking in a single step (e.g. set offset to zero), or in any other manner, as desired.

If the burner has not been activated for a period of time that is greater than the burner on recovery time, then, in block 106, the controller may not adjust the set point (e.g. do not adjust the offset), or in some cases, may increase the offset such as in 3 degree steps to a maximum offset of 9 degrees. In some cases, the controller may continue to run this control sequence during subsequent heating cycles, until the offset is zero.

Figure 6:
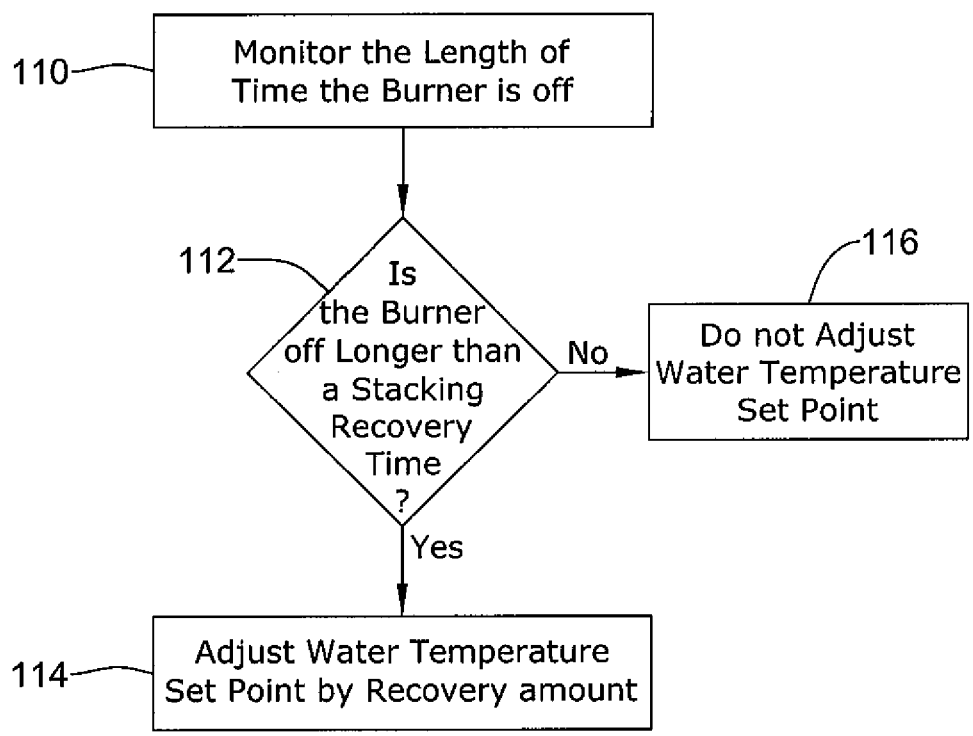
FIG. 6 is a flow diagram of an illustrative method of recovering from stacking in the water heater of FIG. 1.

FIG. 6 is a flow diagram of an illustrative method of recovering from stacking in the water heater of FIG. 1. After the controller has detected that stacking is likely in the water heater, and adjusted the set point (e.g. adjust the offset to be non-zero), the controller may monitor the water heater tank to determine when the effects of stacking likely have dissipated. This illustrative method may provide a method of recovering from stacking during subsequent heating cycles.

In block 110, the controller may monitor the length of time that the burner is off between successive heating cycles. In some cases, the controller, such as the processing block of the controller, may include a clock or timer that may be able to monitor and/or count the time that the burner has been off/deactivated.

Next, in decision block 112, the controller may determine if the burner has been off for a period of time greater than a burner off recovery time. In some cases, the burner off recovery time may be in the range of 100 seconds to 100,000 seconds. In one illustrative example, the burner off recovery time may be 900 seconds. It is contemplated, however, that the burner off recovery time may be any period of time, as desired.

If the burner has been off for a period of time greater than the burner off recovery time, then, in block 114, the controller may adjust the water temperature set point (e.g. offset) by a burner off recovery offset or step. In some cases, the burner off recovery offset may be a value less than the offset. For example, if the offset value of 9 was stored in memory after stacking was detected, the burner off recovery offset may adjust the offset towards zero in incremental steps, such as, for example, 3 degree steps. In this example case, the offset would be adjusted to 6 degrees during a first iteration. It is also contemplated that the offset may be adjusted to recover from stacking in a single step (e.g. set offset to zero), if desired.

If the burner has not been off for a period of time greater than the burner off recovery time, then, in block 116, the controller may not adjust the set point (e.g. do not adjust the offset), or in some cases, may increase the offset such as in 3 degree steps to a maximum offset of 9 degrees. In some cases, the controller may continue to run this control sequence during subsequent heating cycles, until the offset is zero.

Figure 7:
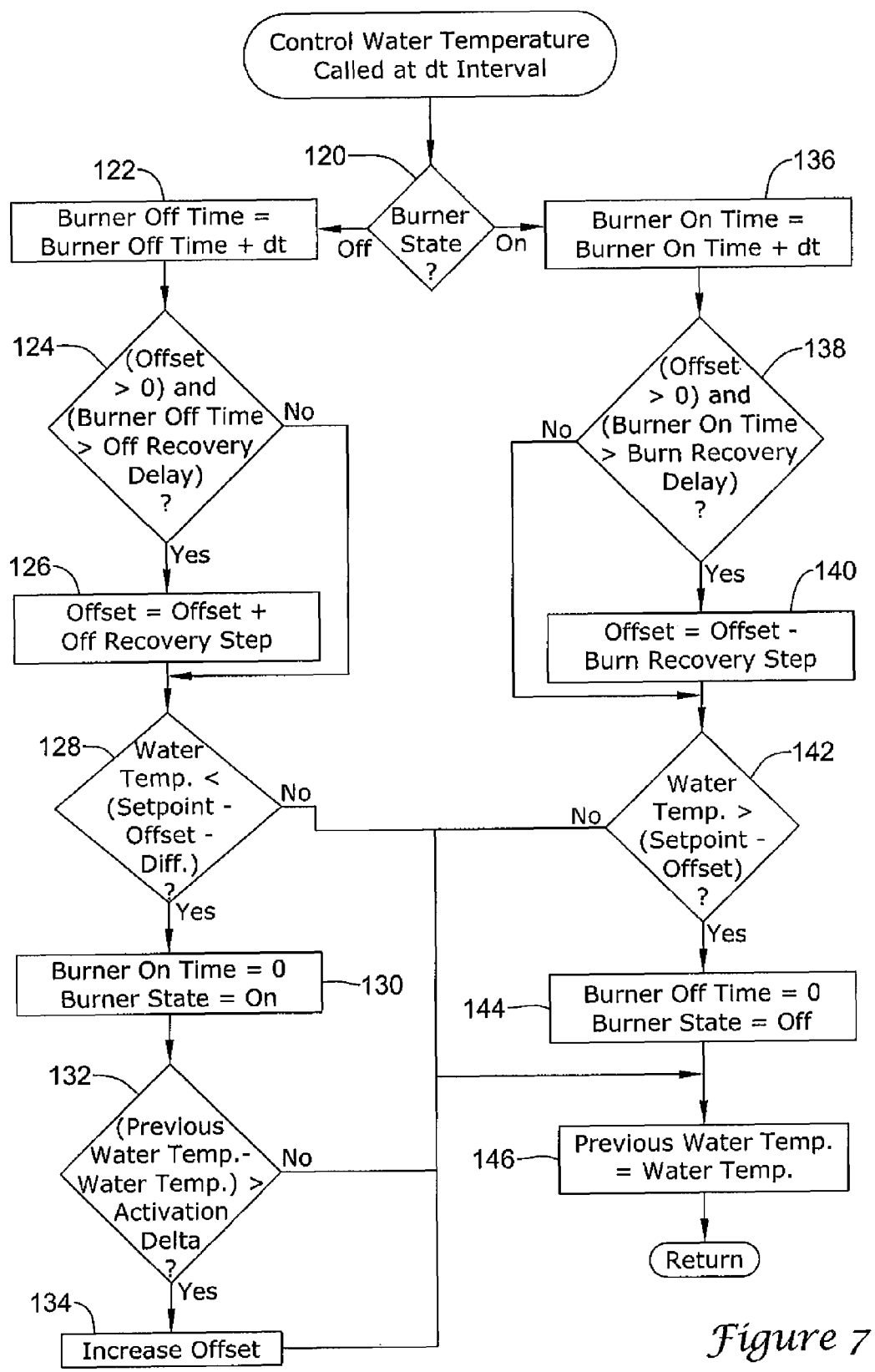
FIG. 7 is a flow diagram of an illustrative method of operating the water heater of FIG. 1.

FIG. 7 is a flow diagram of an illustrative method of operating the water heater of FIG. 1. The illustrative method can provide for the detection of likely stacking in the tank, limiting stacking, and recovering from such stacking. In some cases, the illustrative control sequence may be called or executed at intervals of time, indicated as "dt". In some cases, the interval of time may be on the order of tens of seconds, seconds, tenths of seconds, or any other suitable time interval, as desired. In one illustrative embodiment, the interval of time may be 1 second.

Each time the control sequence is called, in decision block 120, the controller determines the state the burner (e.g. on or off). If the burner is off, then the illustrative control sequence moves to block 122. If the burner is on, the illustrative control sequence moves to block 136.

When the burner is off, and in block 122, the controller may initially increment the period of time that the burner has been off, indicated as BurnerOffTime. In the illustrative case, the BurnerOffTime may be incremented by the interval "dt" (e.g. 1 second). In some cases, BurnerOffTime may be stored in the memory of the controller.

Next, in decision block 124, the controller may determine if the current offset is greater than zero and the BurnerOff-Time is greater than the burner off recovery time, indicated as OffRecoveryDelay. In some cases, the burner off recovery time may be in the range of 100 seconds to 100,000 seconds. In one illustrative example, the burner off recovery time may be 900 seconds, but it is contemplated that any suitable burner off recovery time may be used, as desired.

If the offset is greater than zero and the BurnerOffTime is greater than the OffRecoveryDelay, then, in block 126, the controller decreases the offset by the burner off recovery offset, indicated as OffRecoveryStep. In some cases, the burner off recovery offset may be a value that is less than the offset, but this is not required. For example, it is contemplated that the OffRecoveryStep may be equal to the offset to adjust the offset to zero during a single iteration, if desired. If the offset is not greater than zero or the BurnerOffTime is not greater than the OffRecoveryDelay, then the illustrative control sequence moves to block 128 and does not decrease the offset.

In decision block 128, the controller determines if the current water temperature, indicated as WaterTemperature, is less than the normal user-defined temperature set point, indicated as Setpoint, minus the offset minus the differential. If WaterTemperature is not less than Setpoint minus the offset minus the differential, then the illustrative control sequence moves to block 146 and stores the current water temperature as PreviousWaterTemperature for use in the next iteration of the control sequence.

If WaterTemperature is less than the set point minus the offset minus the differential, then the control sequence moves to block 130. In block 130, the time that the burner has been on, indicated as BurnerOnTime, is set to zero and the burner is turned on, indicated by BurnerState=on.

After the burner has been turned on, in decision block 132, the controller may be able to determine if stacking is likely to be occurring in the water heater tank. The controller may, for example, determine if the PreviousWaterTemp minus the WaterTemperature is greater than the stacking rate of change threshold multiplied by the time interval, indicated as ActivationDelta. The time delta, dt, provides the time difference between when the PreviousWaterTemp measurement and the WaterTemperature measurement were taken. If the PreviousWaterTemp minus the WaterTemperature is not greater than ActivationDelta, then the control sequence may move to block 146, as discussed previously. If the PreviousWaterTemp minus the WaterTemperature is greater than ActivationDelta, then, in block 134, the controller can increase the offset. In some cases, the offset may be increased by a preset value. In one case, for example, the offset may be increased by 9 degrees. However, any suitable offset increase may be used, as desired. Then, after the offset has been increased, the control sequence may move to block 146, where the PreviousWaterTemp is set equal to the current WaterTemperature value for use during the next iteration.

Referring back to block 120, when the burner is on, and in block 136, the controller may initially increment the period of time that the burner has been on, indicated as BurnerOnTime. In the illustrative embodiment, the BurnerOnTime may be incremented by the iteration interval "dt". In some cases, the BurnerOnTime may be stored in the memory of the controller.

Next, in decision block 138, the controller may determine if the offset is greater than zero and the BurnerOnTime is greater than the burner on recovery time, indicated as BurnRecoveryDelay. In some cases, the burner on recovery time may be in the range of 100 seconds to 100,000 seconds. In one illustrative example, the burner on recovery time may be 3,600 seconds, but it is contemplated that the burner on recovery time may be any suitable period of time, as desired.

If both the offset is greater than zero and the BurnerOnTime is greater than the BurnRecoveryDelay, then, in block 140, the controller decreases the offset by the burner on recovery offset, indicated as BurnRecoveryStep. In some cases, the burner on recovery offset may be a value that is less than the offset, but this is not required. For example, it is contemplated that the BurnRecoveryStep may be equal to the offset to adjust the offset to zero during a single iteration, if desired. If either the offset is not greater than zero or the BurnerOnTime is not greater than the BurnRecoveryDelay, then the offset may not be decreased. Control is then passed to block 142.

In decision block 142, the controller determines if the current water temperature, indicated as WaterTemperature, is greater than the normal user-defined temperature set point, indicated as Setpoint, minus the offset. If WaterTemperature is not greater than Setpoint minus the offset, then the control sequence moves to block 146 and stores the current water temperature as PreviousWaterTemperature for the next iteration of the control sequence.

If WaterTemperature is greater than the Set point minus the offset, then the control sequence moves to block 144. In block 144, the time that the burner has been off, indicated as BurnerOffTime, may be set to zero and the burner may be turned off, as indicated by BurnerState=off.

The illustrative control sequence may be repeated. For example, the control sequence may be run at intervals of time, namely "dt", which, in some cases, may be on the order of tenths of seconds, seconds, tens of seconds, or at any other interval as desired.

The illustrative control sequence of FIG. 7 has been described with reference to an offset value that is positive, or where the set point is defined by the normal user-defined temperature set point minus the offset. It is contemplated that, in some cases, the offset may be a negative value where the set point is defined as the normal user-defined temperature set point plus the offset. Also, it is contemplated that a separate control set point may be calculated and used by the controller during stacking conditions. For example, a separate stacking control set point may be defined and set equal to the normal user-defined temperature set point plus/minus the offset, as desired.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A water heater comprising:
    a tank;
    a heater for heating water in the tank;
    a sensor provided a signal corresponding to the temperature of water in the tank;
    a controller coupled to the sensor for receiving the signal corresponding to the temperature of the water in the tank, the controller storing a normal user-defined temperature set point for the water in the tank;

the controller is configured to control the temperature of the water in the tank based on the normal user-defined temperature set point by selectively operating the heater in a sequence of heating cycles, wherein the controller determines a measure related to a length of time of at least some of the heating cycles, and if the measure falls below a threshold value, the controller determines that stacking is likely occurring in the tank;

if the controller determines that stacking is likely occurring in the tank, the controller is configured to control the temperature of the water in the tank based on a second temperature set point, wherein the second temperature set point is lower than the normal user-defined temperature set point; and wherein if the measure falls below the threshold value for one or more heating cycles, and then during a subsequent heating cycle the measure rises above the threshold value, the controller is configured to increase the second temperature set point toward the normal user-defined temperature set point.

2. The water heater of claim 1 wherein the measure related to the length of time of a heating cycle corresponds to the time that the heater is on during the heating cycle.

3. The water heater of claim 1 wherein the measure related to the length of time of a heating cycle corresponds to the time that the heater is off during the heating cycle.

4. The water heater of claim 1 wherein the measure related to the length of time of a heating cycle corresponds to the time that the heater is on and off during the heating cycle.

5. The water heater of claim 1, wherein the second temperature set point is defined by an offset from the normal user-defined temperature set point.

6. The water heater of claim 1, wherein the controller is configured to increase the second temperature set point toward the normal user-defined temperature set point by a recovery offset amount.

7. The water heater of claim 6, wherein the recovery offset amount is less than a difference between normal user-defined temperature set point and the second temperature set point.

8. The water heater of claim 1, wherein the controller is configured to increase the second temperature set point toward the normal user-defined temperature set point during each of two or more heating cycles where the measure remains above the threshold value.

9. A method of operating a water heater having a water tank to limit the effects of stacking in the water tank, the method comprising:

sensing the temperature of the water in the water tank;

controlling the temperature of the water in the water tank based on the sensed water temperature and a first temperature set point;

determining if stacking is likely occurring in the water tank using the sensed water temperature; and if it is determined that stacking is likely occurring in the water tank, controlling the temperature of the water in the water tank based on the sensed water temperature and a second temperature set point, wherein the second temperature set point is lower than the first temperature set point.

10. The method of claim 9, wherein the step of determining if stacking is likely occurring in the water tank comprises:

determining a measure related to a length of time of at least some heating cycles of the water heater;

comparing the measure to a threshold value; and if the measure falls below the threshold value, determines that stacking is likely occurring in the water tank.

11. The method of claim 10, wherein if the measure falls below the threshold value for one or more heating cycles, and then during a subsequent heating cycle of the water heater the measure rises above the threshold value, increasing the second temperature set point toward the first temperature set point.

12. The method of claim 11 wherein the second temperature set point is increased toward the first temperature set point in incremental steps.

13. The method of claim 9, further comprises increasing the second temperature set point toward the first temperature set point during each of two or more heating cycles where the measure remains above the threshold value.

14. The method of claim 9 wherein the step of determining if stacking is likely occurring in the water tank comprises:

determining a rate of change of the water temperature in the water tank; and comparing the rate of change of the water temperature to a threshold rate of change; and determining that stacking is likely occurring in the water tank if the rate of change of the water temperature in the water tank is greater than the threshold rate of change.

* * * * *